US011030535B1

(12) United States Patent
Arora et al.

(10) Patent No.: US 11,030,535 B1
(45) Date of Patent: Jun. 8, 2021

(54) MACHINE LEARNED MERCHANT RATINGS

(71) Applicant: Amazon Technologies, Inc., Seattle, WA (US)

(72) Inventors: Siddharth Arora, Seattle, WA (US); Maciej Golonka, Sammamish, WA (US); Gustavo Eduardo Lopez, Seattle, WA (US); Dana Christopher LoPiccolo-Giles, Seattle, WA (US); Valerie Grace Millar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1338 days.

(21) Appl. No.: 14/749,452

(22) Filed: Jun. 24, 2015

(51) Int. Cl.
G06Q 30/02 (2012.01)
G06N 5/04 (2006.01)
G06N 20/00 (2019.01)

(52) U.S. Cl.
CPC ............ *G06N 5/04* (2013.01); *G06N 20/00* (2019.01); *G06Q 30/0282* (2013.01)

(58) Field of Classification Search
CPC ....... G06N 5/04; G06N 20/00; G06Q 30/0282
See application file for complete search history.

(56) References Cited

U.S. PATENT DOCUMENTS

| 7,552,068 B1 * | 6/2009 | Brinkerhoff | G06Q 10/0639 705/7.32 |
| 2002/0087600 A1 * | 7/2002 | Newbold | G06Q 30/02 715/205 |
| 2010/0122212 A1 * | 5/2010 | Boudalier | G06F 16/958 715/811 |
| 2010/0191680 A1 * | 7/2010 | Lee | G06F 17/30867 706/12 |
| 2011/0295669 A1 * | 12/2011 | Stiebel | G06Q 30/02 705/14.19 |
| 2012/0122592 A1 * | 5/2012 | Stafford | A63F 13/67 463/43 |
| 2013/0246216 A1 * | 9/2013 | Chau | G06Q 30/0222 705/26.7 |
| 2014/0358771 A1 * | 12/2014 | Ali | G06Q 20/22 705/39 |
| 2015/0170227 A1 * | 6/2015 | Kates | G06Q 30/0282 705/347 |

(Continued)

OTHER PUBLICATIONS

G. Acampora, G. Cosma and T. Osman, "An extended neuro-fuzzy approach for efficiently predicting review ratings in E-markets," 2014 IEEE International Conference on Fuzzy Systems (FUZZ-IEEE), Beijing, 2014, pp. 881-887, doi: 10.1109/FUZZ-IEEE.2014.6891829 (Year: 2014).*

(Continued)

Primary Examiner — Gabrielle A McCormick
Assistant Examiner — Maame Ofori-Awuah
(74) Attorney, Agent, or Firm — Lee & Hayes, P.C.

(57) ABSTRACT

Merchant quality may be inferred through machine learning techniques. A customer satisfaction classifier may receive data associated with a customer's engagement with a merchant, and may apply a machine learning model to the received data in order to infer a satisfaction of the customer with the merchant. The inferred satisfaction may be used to determine a rating of the merchant that is imputed to the customer.

20 Claims, 9 Drawing Sheets

(56) References Cited

U.S. PATENT DOCUMENTS

2016/0189253 A1* 6/2016 Zamer ............... G06Q 30/0282
                                                    705/7.34
2016/0253719 A1* 9/2016 Akpala ............. G06Q 30/0282
                                                    705/347

OTHER PUBLICATIONS

Ganu, Gayatree, Yogesh Kakodkar, and AméLie Marian. "Improving the quality of predictions using textual information in online user reviews." Information Systems 38.1 (2013): 1-15 discloses training data to predict user ratings for restaurants (Year: 2013).*

* cited by examiner

MACHINE LEARNED MERCHANT RATINGS

BACKGROUND

A host of an electronic marketplace may work with a number of different merchants who leverage the electronic marketplace to sell their items (e.g., products, services, etc.) to consumers. For example, a restaurant merchant may offer, in an electronic marketplace, food-related items, such as takeout or dine-in services at one or more of its restaurant locations.

Merchants may be rated by consumers according to quality, which may be useful to the consumer community, the host, and to the merchant. For example, a consumer with insight into merchant quality ratings provided by other consumers will be better informed in making a purchasing decision in the electronic marketplace. Furthermore, the host of the electronic marketplace may use merchant ratings to determine which merchants are preferential to consumers, which merchants would be best to work with, and so on. Based on the merchant ratings, the merchant may be able to determine areas in which the merchant can improve its service, which may allow the merchant to provide a more positive consumer experience.

Current techniques for obtaining merchant ratings are limited to providing consumers with a feedback interface that allows them to manually select ratings and to write customer reviews. Manually entering these ratings and reviews can be a tedious, time-consuming process for a customer, which may have the adverse effect of dissuading customers from providing such feedback. As a result, many customers fail to provide any feedback on merchants, which leaves the user community poorly informed about merchant quality, and consumers are not benefitting from previous customer experiences with the merchants.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Embodiments of the present disclosure are directed to, among other things, techniques and systems for inferring merchant quality through machine learning techniques. A customer may engage with a merchant (e.g., by visiting a physical merchant location, visiting the merchant's website, etc.). Upon receiving an indication of such an engagement and receiving data associated with the engagement, a customer satisfaction classifier may apply a machine learning model to the received data in order to infer a satisfaction of the customer with the merchant. The inferred satisfaction may be used to determine a rating of the merchant. In this manner, the machine-learned merchant rating may be imputed to the customer and may be used for various downstream applications.

In some embodiments, the machine-learned merchant rating may be used to automatically create an implicit customer review of the merchant. As used herein, an "implicit customer review" means a review that is system-generated (in the sense that the customer did not explicitly provide the customer review) and thereafter imputed to the customer. By contrast, an "explicit customer review," as used herein, means a review that was explicitly provided (e.g., written) by the customer through a feedback user interface (e.g., a website, an e-mail message, an application associated with a customer device, etc.). In some embodiments, the implicit customer reviews may be surfaced within an electronic marketplace along with other explicit and implicit customer reviews. A user community of the electronic marketplace may thereby consume implicit customer reviews and inferred merchant ratings.

By inferring customer satisfaction with a merchant using machine learning techniques, a seamless and efficient process for rating merchants and generating customer reviews may be provided with minimal customer interaction. For example, an inferred merchant rating and/or an implicit customer review generated by the system may be provided to a customer for validation in a manner that involves minimal customer interaction (e.g., a customer may simply select a button to validate an inferred merchant rating). This, in turn, improves user efficiency in providing merchant ratings and customer reviews. Furthermore, a consumer community may benefit from merchant ratings and customer reviews that are inferred through machine learning techniques, where such ratings and reviews may not have otherwise been provided to the consumer community.

The techniques described herein may be implemented in a number of ways. Example implementations are provided below with reference to the following figures.

Figure 1:
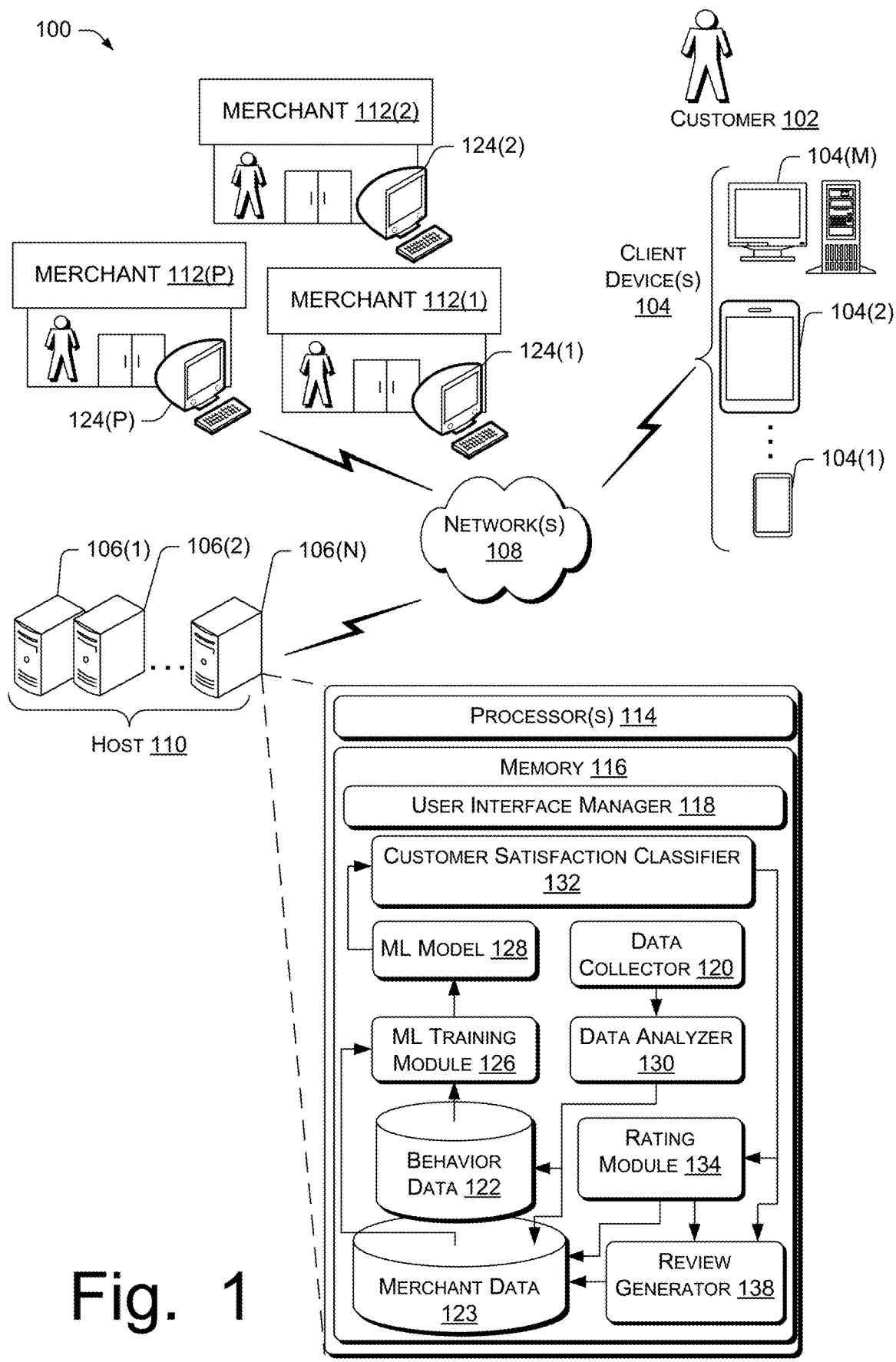
FIG. 1 illustrates an example environment for inferring merchant ratings through machine learning techniques.

FIG. 1 illustrates an example environment 100 for inferring merchant ratings through machine learning techniques. In the environment 100, a customer 102 may utilize one or more client computing devices 104(1), 104(2), . . . , 104(M) (collectively 104) to access one or more servers 106(1), . . . , 106(N) (collectively 106) of an electronic commerce (e-commerce) system via a network(s) 108. The terms "users," "consumers," "customers," or "subscribers" may be used interchangeably herein to refer to customers, such as the customers 102. The client computing devices 104 (sometimes referred to herein as "client devices 104") may be implemented as any number of computing devices, including, without limitation, a personal computer, a laptop computer, a desktop computer, a portable digital assistant (PDA), a mobile phone, tablet computer, an electronic book (eBook) reader device, a set-top box, a game console, a voice-controlled speaker assistant device, a smart television, a wearable device (e.g., a smart watch, electronic "smart" glasses, a fitness tracker, etc.), or any other electronic device that can transmit/receive data over the network(s) 108.

Furthermore, the network(s) 108 is representative of many different types of networks, and may include wired and/or wireless networks that enable communications between the various entities in the environment 100. In some embodiments, the network(s) 108 may include cable networks, the Internet, local area networks (LANs), wide area networks (WAN), mobile telephone networks (MTNs), and other types of networks, possibly used in conjunction with one another, to facilitate communication between the server(s) 106 and the client devices 104. Although embodiments are described in the context of a web based system, other types of client/server-based communications and associated application logic could be used.

The server(s) 106, which may be arranged in a cluster or as a server farm, and across multiple fleets of servers 106, may be maintained and/or operated by a host 110 of an electronic marketplace. The electronic marketplace of the host 110 may be provided via a site (e.g., a website) or another type of information distribution platform with additional types of distribution channels (e.g., electronic mail (e-mail), mobile applications, etc.), and so on. The server(s) 106 are capable of handling requests from many client devices 104 and serving, in response, various information (e.g., web pages, application user interfaces, etc.) that can be rendered on displays of the client devices 104. The host 110 can be any type of entity that hosts an electronic marketplace or a similar portal (e.g., a storefront) that allows customers 102 to acquire (e.g., complete transactions for) items available via the portal. For example, the host 110 may represent an online retailer, or a host of any type of site allowing for online transacting, such as sites including, without limitation, informational sites, social networking sites, deal sites, group buying sites, blog sites, search engine sites, news and entertainment sites, and so forth. In some implementations, the host 110 operates a retail website that hosts an electronic catalog with one or more items provided by various merchants 112(1), 112(2), . . . , 112(P) (collectively 112). Thus, the host 110 may host items that the merchants 112 are offering for sale to consumers, such as the customer 102. "Items," as used herein, may include tangible items, intangible items, products, goods, services, a bundle of items, digital goods or services that are downloaded or streamed (e.g., media clips), sellable units, events, or anything else which might be consumed, purchased, rented, subscribed to, leased, loaned or viewed (hereinafter "acquired") physically, digitally or otherwise via a payment transaction.

In FIG. 1, the server(s) 106 are shown as being equipped with one or more processors 114 and one or more forms of computer-readable memory 116. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable memory 116 may be used to store any number of functional, or executable, components, such as programs and program modules that are executable on the processor(s) 114 to be run as software. Each component stored in the computer-readable memory 116 may comprise computer-executable instructions that, when executed, cause the one or more processors 114 to perform acts and to implement techniques described herein. Each component may be in the form of data structures, program modules, or other data. The components included in the computer-readable memory 116 may include a user interface (UI) manager 118 to, among other things, facilitate presenting or otherwise surfacing information on displays associated with the client devices 104 when the client devices 104 access the server(s) 106. For example, the user interface manager 118 may expose a graphical user interface (GUI) that causes a network-accessible site of the host 110 to be exposed to the customer 102 via a display of the client device 104. The various UIs exposed by the UI manager 118 may surface information including, without limitation, inferred merchant ratings, implicit customer reviews, user prompts related to inferred merchant ratings and/or implicit customer reviews, user settings controls, and the like.

The computer-readable memory 116 may further include a data collector 120 configured to collect or receive behavior data 122 about customers 102 and merchant data 123 about merchants 112. The behavior data 122 may be based on engagements between the customers 102 and the various merchants 112 that provide items for purchase, and it may be indicative of a customer's satisfaction with a particular merchant 112. The customer 102 may engage with a merchant 112 in various ways. For example, the merchants 112 may each have one or more brick-and-mortar locations (merchant locations) that enable the customer 102 to physically visit the merchant 112 at the merchant location and purchase items from the merchant 112 at the merchant location. Additionally, or alternatively, the merchant 112 may have an electronic marketplace (e.g., a website) that is accessible to the customer 102 via the network(s) 108. In this scenario, the customer 102 may search and/or browse items offered online by the merchant 112, save items to an electronic shopping cart, and so on. Additionally, or alternatively, the merchant 112 may offer its items for acquisition via the electronic marketplace of the host 110.

In an illustrative example, the merchant 112(1) may represent a restaurant merchant with a physical merchant location that the customer 102 can visit to receive dine-in or take-out services. When visiting the merchant 112(1), the customer 102 may carry a mobile client device 104 with him/her. In addition, the merchant 112(1) may have a point of sale (POS) system 124(1) that is used to process transactions for the customers 102. For example, after the customer 102 has finished a meal at the restaurant location of the merchant 112(1), the customer 102 may pay for the meal by processing a payment instrument (e.g., a credit card, stored value card, debit card, etc.) or cash through the POS system 124(1). If the customer 102 leaves a gratuity, data regarding the gratuity (a type of behavior data 122) may be collected by the POS system 124(1) and/or by the customer's mobile client device 104 (if paying through a mobile payment application on the device 104). Likewise, the mobile client device 104 and/or the POS system 124(1) may obtain additional behavior data 122, such as a number of drinks the customer 102 ordered, a transaction amount the customer 102 spent during the engagement, and so on, and this behavior data 122 may be transmitted over the network(s) 108 to the server(s) 106 for collection by the data collector 120.

In general, the behavior data 122 may include, without limitation, purchase data (e.g., an amount of gratuity (or "tip") provided by the customer 102, transaction amounts for items purchased by the customer 102, quantities of items ordered, types of items ordered, etc.), the amount of time spent (duration of the visit) at the merchant location or on the merchant's website or mobile shopping application, the time (e.g., time of day and/or date) of the customer engagement with the merchant 112, an amount of time the customer 102 waited to be served (e.g., seated at a table) by the merchant 112, a number of friends accompanying the customer 102 or otherwise invited by the customer 102 to the engagement, social signals (e.g., "likes," hashtags, check-ins, etc.), audio data obtained via a microphone of the client device 104, an amount of time and/or number of instances the customer 102 used a mobile device 104 while visiting a merchant location, customer browsing behavior on a merchant's 112 website, click-through data from the merchant's 112 website, explicitly-provided customer ratings/scores of the merchants 112, explicit customer reviews of the merchants 112, customer activity subsequent to the engagement with the merchant 112 (e.g., visiting a different, but similar merchant 112), and so on.

The above-described behavior data 122 may be indicative of the customer's satisfaction with a particular merchant 112 that the customer 102 has engaged, and thus, the behavior data 122 may be used with machine learning techniques to infer customer satisfaction with merchants 122. Accordingly, a machine learning training module 126 is configured to train a machine learning model 128 with the behavior data 122. Furthermore, the machine learning training module 126 is configured to train the machine learning model 128 with the merchant data 123 about merchants 112, which may include, without limitation, explicitly-provided merchant ratings, explicitly-provided customer reviews, business category or type, retail (brick-and-mortar) location(s), corporate office location(s), revenue metrics, number of employees, advertising platforms, and so on.

In some embodiments, the data collected by the data collector 120 may be processed or analyzed by a data analyzer 130 to calculate various metrics associated with the customer 102 and/or a merchant 112, which may be any quantifiable attribute or statistical value calculated from the raw behavior data 122 or raw merchant data 123. For instance, the data analyzer 130 may calculate an average gratuity provided by the customer 102, and specific average gratuities may be determined for a specific type of merchant 112 (e.g., the average gratuity at restaurants, the average gratuity at salons or spas, the average gratuity coffee stands, etc.). Other metrics calculated by the data analyzer 130 using the behavior data 122 and/or the merchant data 123 may include, without limitation, an average amount of time spent (average duration of a visit) at the merchant location or on the merchant's site, a frequency of purchasing a particular item and/or a frequency of purchasing items from a particular merchant 112, a number of times, or frequency at which, the customer 102 has visited a particular merchant 112, an average transaction amount at a particular type of merchant 112, an average quantity of items ordered/purchased, number of likes or posts on a social media site regarding a particular merchant 112, a number of positive or negative emotive words recognized in text or audio data, statistics on merchant ratings (e.g., average number, total number, mode, median, etc.), and so on. The behavior data 122 and the merchant data 123 may therefore include both raw data collected via the network(s) 108 and metrics determined by the data analyzer 130, which may provide a rich set of behavior data 122 and merchant data 123 for training the machine learning model 128. Metrics may provide data that can be used to gauge anomalies in the behavior data 122 and the merchant data 123 used by the machine learning model 128. That is, customer behaviors may vary in terms of the amount they tip, how frequently they visit certain types of merchants, the amount of time they spend at merchant locations, and so on. Metrics provide insight into these variables.

The machine learning model 128 may represent any suitable machine learning model(s) including, without limitation, logistic regression-based classification models, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, or an ensemble of one or more of the aforementioned techniques. It is to be appreciated that the machine learning model 128 may represent a single or multiple machine learning models 128. Furthermore, the machine learning model 128 may be trained using a supervised, unsupervised, or semi-supervised machine learning technique.

In general, the machine learning model 128 may be trained to identify correlations between the collected data (i.e., the behavior data 122 and the merchant data 123) and customer satisfaction with the merchants 112 in order to predict merchant quality. In some embodiments, the machine learning model 128 may determine weights or coefficients associated with different types of behavior data 122 (e.g., a weight for data relating to gratuities provided by the customer 102, another weight for data relating to the amount of time spent (duration of the visit) at the merchant 112, and so on), and/or different types of merchant data 123. These weights/coefficients may indicate the relative importance of each type of behavior data 122 and/or each type of merchant data 123 in predicting customer satisfaction. Types of behavior data 122 and/or merchant data 123 that have higher weights will have a greater influence on the determination of customer satisfaction. Weights may comprise an integer, a percentage, or a fractional multiplication factor, and may be normalized weights (i.e., all weights sum to 1). In this manner, different types of behavior data 122 and/or merchant data 123 may have different impact on determined customer satisfaction. Furthermore, the weights/coefficients may vary from merchant 112 to merchant 112, or from one type of merchant 112 to another type of merchant 112. For example, data relating to gratuities provided by the customer 102 may be more important to a restaurant merchant 112, but less important, or not relevant at all, to a clothing/apparel merchant 112.

In some embodiments, the machine learning model 128 can identify what types of customer behavior is tied to an item and what type of customer behavior is tied to the merchant 112. For example, a gratuity could be tied to both the item and the merchant. Whereas, the frequency of purchase of a particular item (e.g., a Phad Thai entre) is tied to the item.

In some embodiments, the machine learning model 128 may comprise a logistic regression-based classification model configured to classify a particular merchant 112 with a class label from a set of multiple class labels (e.g., two class labels: high customer satisfaction and low customer satisfaction). Logistic regression may be used to model the posterior probabilities of K classes with linear functions of inputs, where K is a finite number of classes. A binary logistic regression-based classification model may comprise two classes, although any number of three or more class labels may be used in a multi-class logistic regression-based classification model. As part of the model training process, merchants 112 may be labeled with one of the multiple class labels based on the behavior data 122 associated with each merchant 112.

The machine learning model 128, once trained, may be used by a customer satisfaction classifier 132 to infer a satisfaction of the customer 102 with respect to a particular merchant 112 based on data associated with a particular engagement of the customer 102 with the particular merchant 112. For example, the customer 102 may visit a restaurant location of the merchant 112(1), may order a Phad Thai entre for $10, may leave a $3 gratuity (which may be 10% more than his/her usual gratuity), may orders 2 more drinks than his/her average number of drinks, may visit the merchant 112(1) again with friends, and may spend one hour more than usual engaging with the merchant 112(1). All of these signals (input data associated with the engagement) individually, and in combination, indicate that the customer 102 enjoyed his/her experience at the merchant 112(1). Thus, the customer satisfaction classifier 132 may receive various input data based on such a customer engagement with the merchant 112(1), and may apply the machine learning model 128 to the received input data to return a customer satisfaction "score" that is indicative of the customer's satisfaction with the merchant 112(1). When using a logistic regression-based classification model 128, the output of the customer satisfaction classifier 132 may be a conditional probability of a merchant 112(1) being in class 1 (e.g., the customer 102 is satisfied with the merchant 112(1)), or class 2 (e.g., the customer 102 is unsatisfied with the merchant 112(1)), given the input data. In other words, the customer satisfaction classifier 132 may provide class probabilities. With the output of the customer satisfaction classifier 132, the system may determine that the merchant 112(1) ranks in the top 10% of merchants 112 the customer 102 has visited, and a rating module 134 may assign a rating (e.g., 9 out of 10) for the merchant 112(1).

In some embodiments, the machine learning model 128 may be trained on groups or categories of customers 102 to return a customer satisfaction score for a particular customer 102 who falls within a certain group or category. This may be based on customer data such as demographics (e.g., gender, age, income, and the like), purchase history, viewing history, preferences, and so on. In some cases, training the machine learning model 128 for groups of customers 102 may address the so-called "cold start" problem where the system cannot obtain sufficient information on a particular customer 102 to accurately predict customer satisfaction. For example, a customer 102 that initially registers with the host 110 may not have any behavior data 122 stored in association with the customer 102 (e.g., little to no purchase history, viewing history, etc.) such that prediction of customer satisfaction may be based on similar customers 102 for which a sufficient amount of behavior data 122 has been obtained.

As noted above, the output of the customer satisfaction classifier 132 may be provided to the rating module 134 and/or a review generator 138. The rating module 134 may be configured to determine a rating for a particular merchant 112 based on the customer satisfaction score (e.g., class label) for the particular merchant 112. The rating module 134 may determine a merchant rating on any suitable scale or range, such as a 5-star rating scale. For example, a highest customer satisfaction score from the classifier 132 may correspond to a 5-star rating. In some embodiments, the rating module 134 can generate multiple ratings for a particular merchant 112, such as merchant ratings for different categories (e.g., service—both timeliness and quality, items quality, cleanliness of merchant location, etc.). The ratings determined by the rating module 134 are inferred from the customer satisfaction score, rather than provided by the customer 102 explicitly. The determined ratings may be stored as new merchant data 123 in a data store (e.g., a database) for the various merchants 112 that utilize the electronic marketplace of the host 110. In some embodiments, merchant ratings may be used to rank the merchants 112.

The review generator 138 may be configured to generate an implicit (i.e., system-generated) customer review based on a merchant rating for a particular merchant 112 output by the rating module 134 and/or a customer satisfaction score for a particular merchant 112 output by the customer satisfaction classifier 132. Thus, one or more implicit customer reviews can be generated from the customer satisfaction score, the merchant rating, or a combination thereof. In some embodiments, the review generator 138 may utilize templates to generate implicit customer reviews. For example, one template may be used for a 5-star rating, while another template may be used for a 1-star rating. Table 1, below, illustrates an example chart that maps star ratings to terms used in templates used to generate implicit customer reviews:

TABLE 1

| Star Ratings Mapped to Template Terms | |
|---|---|
| Star Rating | Template Term(s) |
| 5 Stars | "Excellent"; "Perfect" |
| 4 Stars | "Great"; "Awesome" |
| 3 Stars | "Good"; "Expected" |
| 2 Stars | "Mediocre"; "Subpar" |
| 1 Star | "Poor"; "Bad"; "Awful" |

In some embodiments, multiple templates may be associated with each level on a chosen rating scale, and each templates used to generate implicit customer reviews can be selected based on the type of data that the classifier 132 receives in association with a particular customer engagement. For example, the customer 102 may leave a larger-than-usual gratuity at a restaurant location of the merchant 112(1), the rating module 134 may generate a 5-star rating, and the review generator 138 may select a template with language pertaining to "gratuities" and terms mapped to a 5-star rating to generate the implicit customer review. For example, a template selected may read: "Service was excellent, so I tipped high!" In another example, the customer 102 may order 5 drinks (which may be 2 more drinks than the customer's 102 typical amount of 3 drinks). As a result, the rating module 134 may generate a 5-star rating, and the review generator 138 may select a template with language pertaining to "drinks" to generate the implicit customer review. For example, a template selected in this scenario may read: "Excellent place for drinks!" The implicit customer reviews may also be stored as new merchant data 123 in a data store.

It is to be appreciated that, as additional behavior data 122 is collected by the data collector 120, the machine learning training module 126 may continually update and retrain the machine learning model 128 with the new behavior data 122. In this manner, the machine learning model 128 may be continually refined as new behavior data 122 associated with customer-merchant engagements is gathered.

Figure 2:
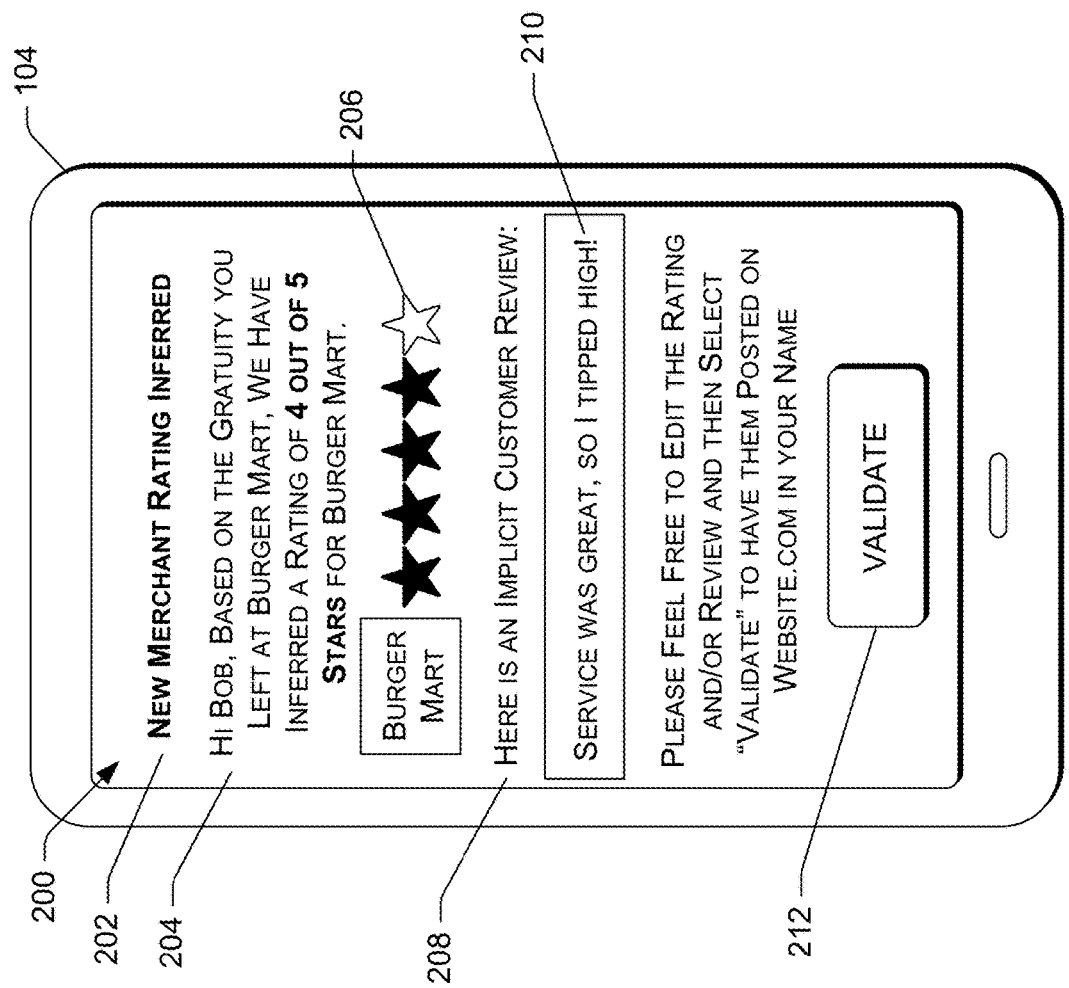
FIG. 2 illustrates an example screen rendering of a user interface to prompt a customer to validate an inferred merchant rating and an implicit customer review.

FIG. 2 illustrates an example screen rendering of a user interface (UI) 200 to prompt a customer 102 to validate an inferred merchant rating and an implicit customer review. The UI 200 may comprise a graphical user interface (GUI). In some embodiments, the UI 200 may comprise a Web browser or other browser interface that can format text based on hypertext markup language (HTML) code. The UI 200 may be stored and executed locally on the client device 104. Additionally, or alternatively, the UI 200 may be accessed over the network 108 and presented, displayed, or otherwise communicated to the client device 104 to allow the customer 102 to view and interact with prompts regarding inferred merchant ratings.

The UI 200 may include a message 202 to the customer 102 that a new merchant rating has been inferred by the customer satisfaction classifier 132 and the rating module 134 of FIG. 1. The UI 200 may further include a description 204 of how the classifier 132 and the rating module 134 determined the inferred merchant rating. For example, if data associated with a customer-merchant engagement pertains to a larger-than-normal gratuity provided by the customer 102 at the merchant's location, the description 204 may indicate that the inferred merchant rating was determined based on the gratuity that the customer 102 provided. In the example of FIG. 2, a customer 102 named Bob left a larger-than-normal gratuity at a merchant 112 called "Burger Mart," which, at least in part, caused an inferred merchant rating of 4 out of 5 stars. As such, the UI 200 may further include an inferred merchant rating 206 that was inferred for the merchant 112.

The UI 200 may further include a message 208 that informs the customer 102 of an implicit customer review that has been generated for the customer 102 based on an inferred customer satisfaction score output by the customer satisfaction classifier 132 and/or the inferred merchant rating 206 from the rating module 134. A review statement 210 initially presented via the UI 200 may comprise a default review statement 210 that is generated by the review generator 138 using one or more templates. For example, a template reading "Service was great, so I [ ]!" may be used with an identified customer behavior (e.g., leaving a larger than normal gratuity) to fill in the bracketized portion of the template with a word or phrase regarding gratuities, such as "tipped high", or a similar phrase. In this manner, the review statement 210 of "Service was great, so I tipped high!" may be generated and presented by default.

The UI 200 may further include a selectable option 212 to validate the inferred merchant rating 206 and the review statement 210. The selectable option 212 may be in any form, such as a soft button, such that, upon selection, the inferred merchant rating 206 and the review statement 210 may be posted to a website of the host 110 as parts of an implicit customer review. It is to be appreciated that the inferred merchant rating 206 and/or the review statement 210 may be automatically posted or surfaced in the electronic marketplace of the host 110 without interaction from the customer 102. However, upon selecting the validate button 212, an implicit customer review based on the review statement 210 may be converted to an explicit customer review and surfaced in the electronic marketplace as an explicit customer review based on customer validation of the review.

Before validation, the inferred merchant rating 206 and/or the review statement 210 may be edited by the customer 102 through user input (e.g., touch screen user input) received at the client device 104. For example, if the customer 102 disagrees with the inferred merchant rating 206, the customer 102 may touch a star (e.g., the first, second, third, or fifth star) to adjust the inferred merchant rating 206. Similarly, the customer 102 may touch anywhere within the field where the review statement 210 is displayed to edit the review statement 210. In some embodiments, there may be a fixed portion and an editable portion of the review statement 210 such that the customer 102 can edit the editable portion, but not the fixed portion. In other embodiments, the entire review statement can be edited by the customer 102. After editing, selection of the validate button 212 validates the updated rating 206 and/or review statement 210.

The prompt shown in FIG. 2 can be provided through any suitable channel to the customer 102 for viewing on the client device(s) 104. For example, prompting may be provided via electronic mail (e-mail), push notifications on the client device 104, Short Message Service (SMS) text, phone call, a mobile application, a website, a social networking site, and the like.

Figure 3:
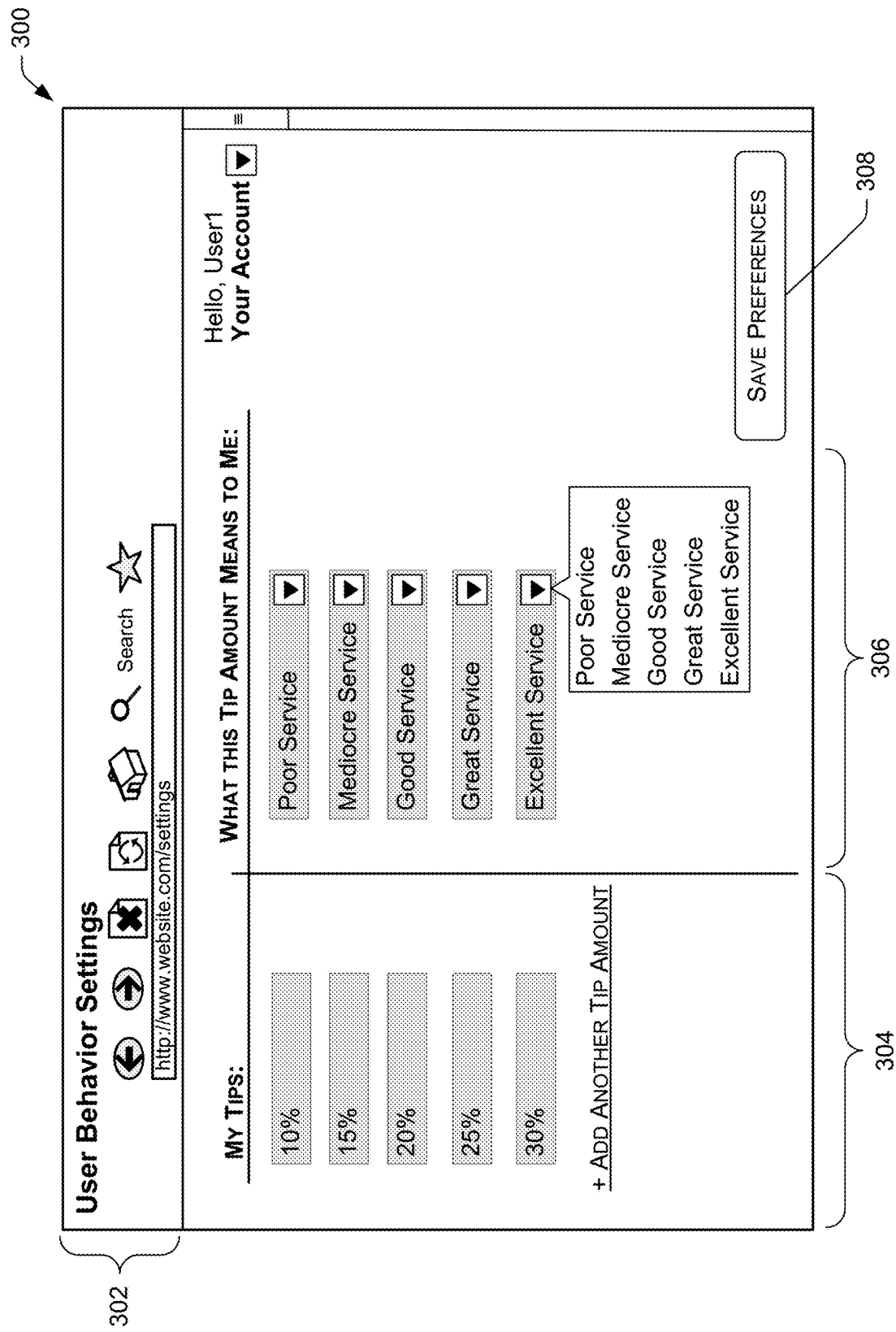
FIG. 3 illustrates an example screen rendering of a user interface to allow a customer to configure user settings for behavior data.

FIG. 3 illustrates an example screen rendering of a user interface (UI) 300 to allow a customer 102 to configure user settings for behavior data 122. Similar to the UI 200 of FIG. 2, the UI 300 may comprise a graphical user interface (GUI), which may be a Web browser or other browser that can format text based on HTML code.

The UI 300 may include a navigation pane 302 to navigate within an electronic marketplace of the host 110. In the example of FIG. 3, the customer 102 has navigated to a user settings webpage that provides controls for overriding behavioral defaults assumed by the system in regards to user behaviors. In the example of FIG. 3, the default behavior presented for adjustment or validation is the gratuity amount that the customer 102 provides to merchants 112.

The UI 300 may include a "my tips" column 304 that lists different tip amounts or percentages (e.g., 10%, 15%, 20%, etc.) in text fields that are editable by the customer 102. For example, the customer 102 can select any of the text fields in the "my tips" column 304 and enter a number from 0 to 100 to modify any individual tip amount listed, and the customer 102 may have the option of adding additional tip amount entries to the list. It is to be appreciated that the customer 102 may also delete any individual entries to specify any number of different tip amounts in the "my tips" column 304.

The UI 300 may further include a "meaning" column 306 that provides a label for the corresponding tip amount in the "my tips" column 304 indicating what the tip amount means to the customer 102. Each entry in the "meaning" column may provide a drop down menu to select a label from a set of available labels. The system may assign default labels, as shown in FIG. 3 that the customer 102 can override by selecting different labels from the drop down menus. This settings feature allows for level setting by customer 102 and accounts for differences between respective customers 102. For instance, a 15% gratuity provided by a first customer 102 may correspond to "excellent service", while the same gratuity amount provided by a second customer 102 may correspond to "mediocre service". The UI 300 may provide a selectable option 308 to save the customer's preferences as indicated in the columns 304 and 306.

Figure 4:
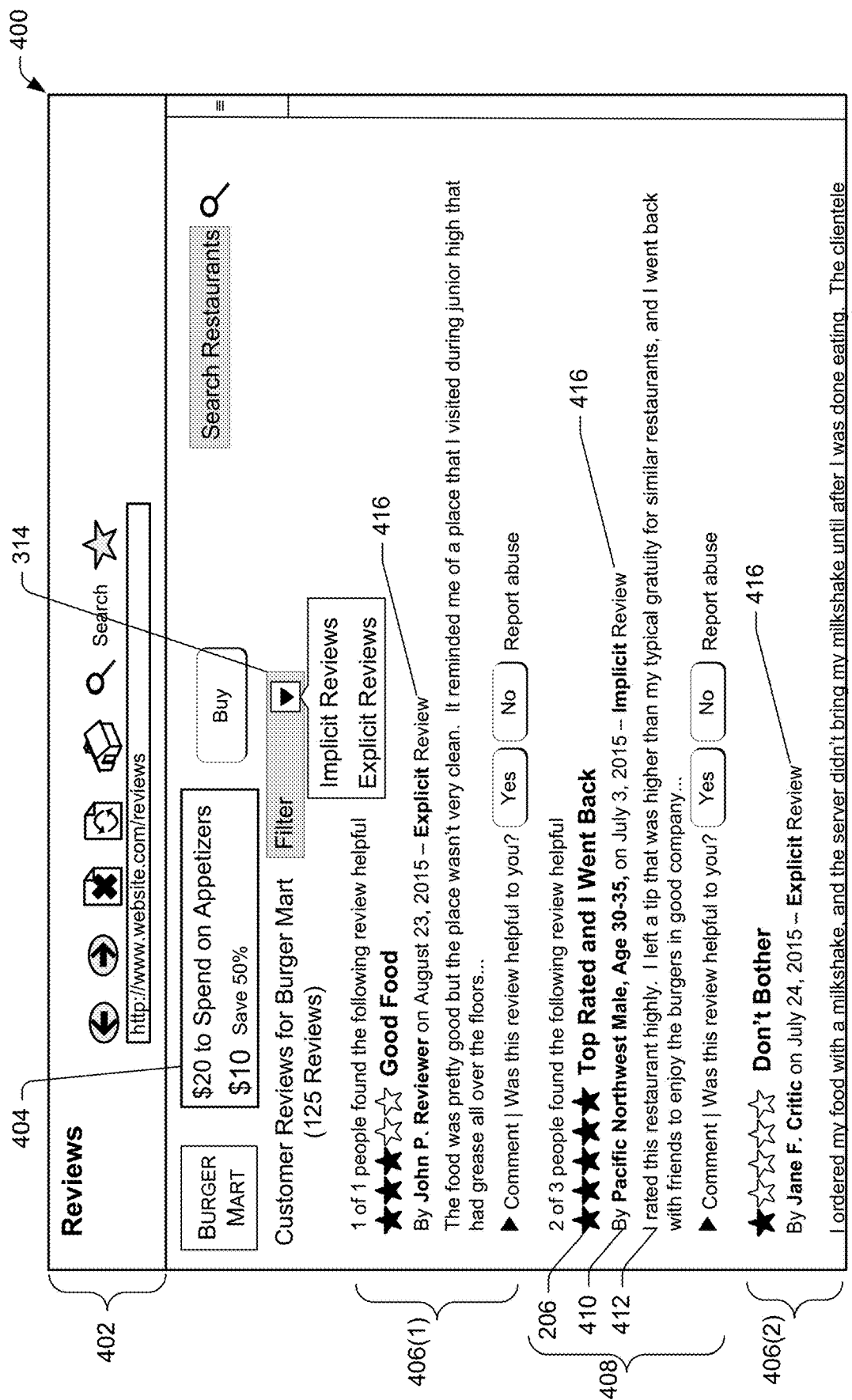
FIG. 4 illustrates an example screen rendering of a user interface for presenting inferred merchant ratings and implicit customer reviews in a customer review forum.

FIG. 4 illustrates an example screen rendering of a user interface (UI) 400 for presenting inferred merchant ratings and implicit customer reviews in a customer review forum. Similar to the UI 200 of FIG. 2, the UI 400 may comprise a graphical user interface (GUI), which may be a Web browser or other browser that can format text based on HTML code. In some embodiments, the UI 400 represents the customer 102 accessing a webpage or a mobile application for the electronic marketplace of the host 110.

The UI 400 may include a navigation pane 402 to navigate within an electronic marketplace of the host 110. In the example of FIG. 4, the customer 102 has navigated to a customer review forum or webpage that provides merchant ratings and customer reviews for the merchant 112 "Burger Mart." FIG. 4 illustrates an example where the customer 102 is viewing a deal 404 (e.g., discount, coupon, etc.) relating to an item (e.g., food) provided by the merchant 112 while viewing ratings of the merchant 112 and customer reviews for the merchant 112.

A list of customer reviews shows two explicit customer reviews 406(1) and 406(2), which are customer reviews provided by the respective customers themselves, as well as an implicit customer review 408, which was automatically generated by the review generator 138. As shown in FIG. 4, the implicit customer review 408 may include a title or heading that states "Top Rated and I Went Back," which may be based on data collected by the data collector 120 indicating that the customer 102 returned to the merchant 112 on at least one subsequent visit. Accordingly, the heading shown in FIG. 4 may be one of multiple headings that can be associated with a 5-star rating so that the heading can be customized to the specific data that influences the rating.

The implicit customer review 408 may further include an anonymous description 410 of the customer 102. This may be at the preference of the customer 102 and implemented through user settings to post implicit customer reviews 408 with an anonymous description 410 to hide the identity of the customer 102. The anonymous description 410 may be generated from customer data, such as demographic information input by the customer 102 in a user profile, or information obtained through location information, and the like. In other embodiments, the implicit customer review 408 may be posted with the username of the customer 102, or the customer's real name. Text 412 of the implicit customer review 408, which may correspond to the review statement 210 of FIG. 2, may indicate the type of data associated with the customer-merchant engagement that was used to generate the implicit customer review 408. For example, the text 412 may indicate that the customer 102 left a larger-than-usual gratuity, and that the customer 102 invited friends to visit the merchant 112 with the customer 102. In some embodiments, icons relating to certain types of behavioral data 122 may be interspersed within the text 412. For instance, a "$" icon may indicate a large gratuity or a large purchase in general, a "thumbs up" icon may indicate general enjoyment or a high customer satisfaction of the merchant 112, and so on. The implicit customer review 408 may further include the inferred merchant rating 206.

The explicit customer reviews 406 and the implicit customer reviews 408 may be tagged in order to distinguish the implicit customer reviews 408 from the explicit customer reviews 406, which may enable many downstream applications, such as filtering, searching, and the like. FIG. 4 shows that the UI 400 may further include a filtering mechanism 414 (e.g., a drop down menu) for a user to filter the customer reviews by the implicit customer reviews 408 or the explicit customer reviews 406, and/or any additional filtering criteria (e.g., most recent, most popular, etc.). Furthermore, visual indicators 416 (e.g., textual identifiers, icons, etc.) may be presented in association with the customer reviews to visually distinguish the implicit customer reviews 408 from the explicit customer reviews 406.

Figure 5:
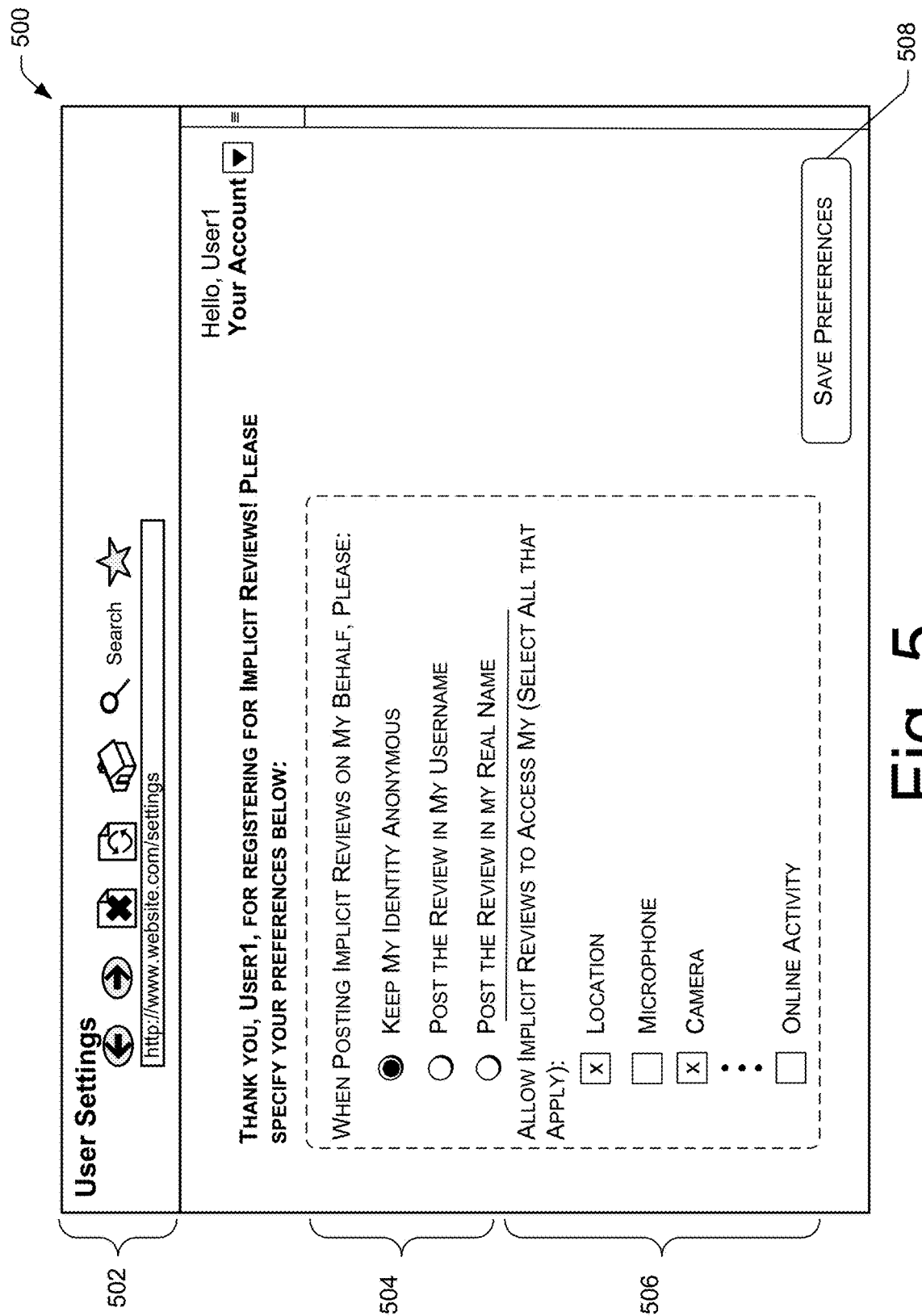
FIG. 5 illustrates an example screen rendering of a user interface to allow a customer to configure user settings for the generation of implicit customer reviews.

FIG. 5 illustrates an example screen rendering of a user interface (UI) 500 to allow a customer 102 to configure user settings for the generation of implicit customer reviews, such as the implicit customer review 408. Similar to the UIs 200 and 400 of FIGS. 2 and 4, the UI 500 may comprise a graphical user interface (GUI), which may be a Web browser or other browser that can format text based on HTML code.

The UI 500 may include a navigation pane 502 to navigate within an electronic marketplace of the host 110. In the example of FIG. 5, the customer 102 has navigated to a user settings webpage that provides controls for configuring user settings in regards inferred merchant ratings and implicit customer reviews. The UI 500 may include a first settings control 504 (e.g., radio buttons for selection) that allows the customer 102 to specify an anonymity level when surfacing implicit customer reviews 408 based on the customer's engagements with merchants 112. For example, the customer 102 may specify that he/she would like to keep his/her identity anonymous, in which case, the anonymous description 410 of FIG. 4 may be presented in association with implicit customer reviews 408 that are surfaced in the electronic marketplace. Alternatively, the customer 102 may choose to have implicit customer reviews 408 posted with his/her username (e.g., a user identifier made up of alphanumeric characters), or posted with his/her real name.

The UI 500 may further include a second settings control 506 that allows the customer 102 to specify levels of access to personal information that may be used by the system. For example, the customer 102 may specify whether the system can use his/her location information (e.g., based on global positioning system (GPS) data, social media check-ins, etc.), or whether the system can access the microphone of the customer's client device 104 to record audio data during a customer-merchant engagement, or the camera of the client device 104 to record images and/or video during a customer-merchant engagement, or whether the system can access online activities of the customer 102 during a customer-merchant engagement (e.g., click-through data, browsing behavior, search queries, etc.). The UI 500 may provide a selectable option 508 to save the customer's preferences as indicated in the selected settings controls 506 and 508.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
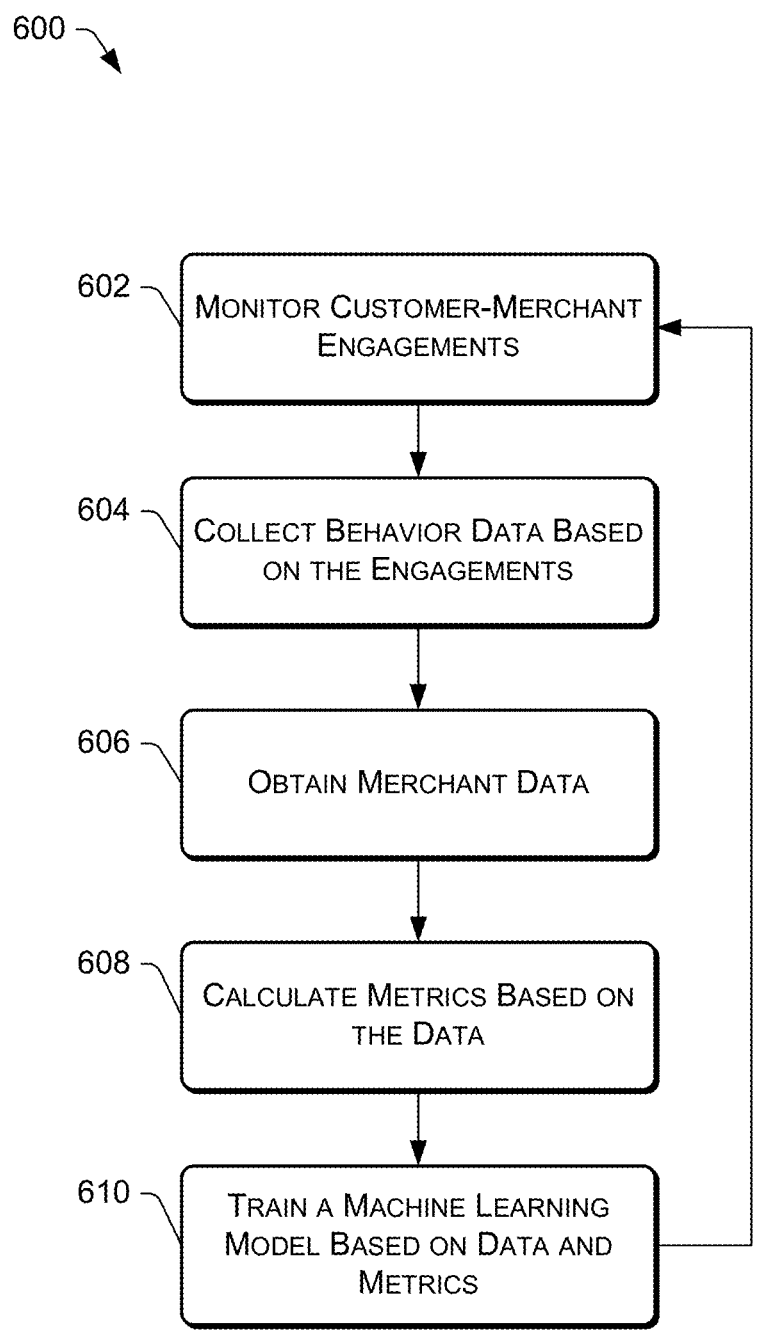
FIG. 6 is a flow diagram of an illustrative process for training a machine learning model from behavior data associated with customer-merchant engagements.

FIG. 6 is a flow diagram of an illustrative process 600 for training a machine learning model 128 from behavior data 122 associated with customer-merchant engagements. For discussion purposes, the process 600 is described with reference to the environment 100 of FIG. 1, and specifically with reference to the data collector 120 and the machine learning training module 126.

At 602, the data collector 120 may monitor engagements between a customer 102 and merchants 112. Monitoring at 602 may be based on indications of customer-merchant engagements. For example, the data collector 120 may receive, over the network(s) 108, an indication that the customer 102 has processed a payment at a merchant 112(1), indicating that the customer 102 engaged with the merchant 112(1) to pay for an item offered by the merchant 112(1).

At 604, behavior data 122 associated with the engagement monitored at 602 may be collected. For example, data regarding a gratuity provided by the customer 102 at the merchant 112(1) may be collected at 604. At 606, merchant data 123 may be obtained. For example explicit merchant ratings and explicitly-provided customer reviews about merchants 112 may be obtained from data stores of websites that collect such ratings and reviews.

At 608, the data analyzer 130 may calculate metrics based on the data collected at 604 and obtained at 606. For example metrics may be calculated for the customer 102 based on the behavior data 122 such as data on gratuities, durations of visits, number of items ordered, and the like. Any quantifiable attribute or statistical value may be calculated from the raw behavior data 122 at 608, such as an average gratuity provided by the customer 102, an average duration of customer engagements, and so on.

At 610, the machine learning training module 126 may train the machine learning model 128 based on the behavior data 122, the merchant data 123, and the metrics calculated at 608. In some embodiments, the machine learning model 128 may be trained to identify correlations between the data (behavior data 122 and/or merchant data 123) and customer satisfaction with the merchants 112 in order to predict merchant quality. In some embodiments, the machine learning model 128 may determine weights or coefficients associated with different types of data in the behavior data 122 and/or the merchant data 123. In some embodiments, a logistic regression-based classification model 128 may be trained at 610 by labeling merchants 112 with one of the multiple class labels based on the behavior data 122 associated with each merchant 112.

The process 600 may iterate, as shown, to continually retrain the machine learning model 128 as new behavior data 122 and merchant data 123 is collected. In this manner, the process 600 may train a machine learning model 128 to infer customer satisfaction based on input data relating to customer-merchant engagements.

Figure 7:
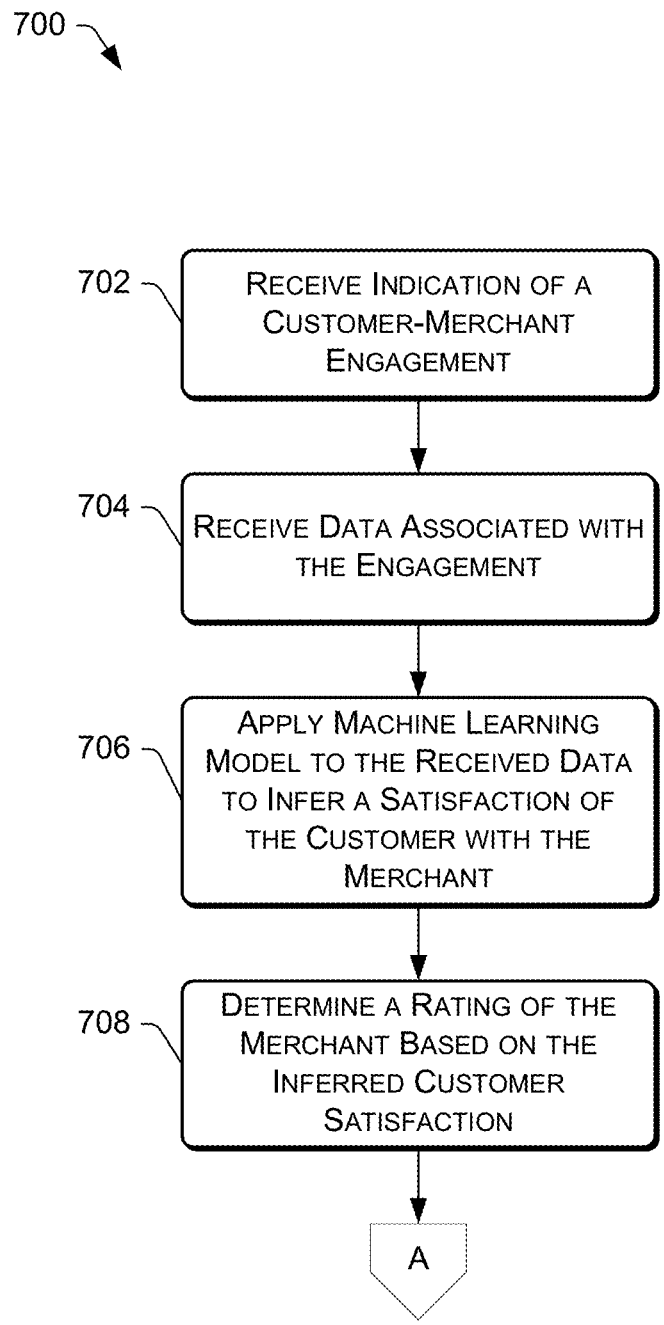
FIG. 7 is a flow diagram of an illustrative process for inferring merchant ratings through machine learning techniques.

FIG. 7 is a flow diagram of an illustrative process 700 for inferring merchant ratings through machine learning. For discussion purposes, the process 700 is described with reference to the environment 100 of FIG. 1, and specifically with reference to the machine learning model 128, the customer satisfaction classifier 132, and the rating module 134.

At 702, the server(s) 106 may receive an indication of an engagement of a customer 102 with a merchant 112. When the customer 102 physically visits a merchant location of the merchant 112 (e.g., a restaurant), the indication received at 702 may come from any suitable source, such as from the customer 102 checking in on a social media application via his/her client device 104, a GPS receiver of the client device 104 indicating that a location of the client device 104 is within a threshold distance from (i.e., proximate to) the merchant location, communication of the customer's client device 104 with a beacon (e.g., a Bluetooth® beacon) situation in the merchant location, a transaction being processed by the POS system 124 of the merchant 112 and/or the client device 104 via a mobile payment application, and so on. Any such indication may be received at the server(s) 106 over the network(s) 108 to indicate that the customer 102 has engaged with the merchant 112 on some level, whether it is a mere visit and departure, or the customer 102 stays and purchases items, performs other activities, and so on. In the online scenario, the customer 102 accessing a website or a mobile application of the merchant 112, or conducting a transaction on the website or mobile application, may act as the indication received at 702.

At 704, the data collector 120 may receive data associated with the engagement. The data received at 704 may comprise any of the types of behavior data 122 mentioned herein, such as data pertaining to a gratuity provided by the customer 102 during the customer-merchant engagement, a duration of the customer's engagement with the merchant 112, or any similar data.

At 706, the customer satisfaction classifier 132 may apply the machine learning model 128 to the data received at 704 to infer a satisfaction of the customer 102 with the merchant 112. The inferred customer satisfaction may be in the form of a customer satisfaction score output by the classifier 132, where a high score indicates that the customer 102 was satisfied with the merchant and a low score indicates that the customer 102 was unsatisfied with the merchant. When using a logistic regression-based classification model 128, the customer satisfaction inferred at 706 may comprise a conditional probability of a merchant 112(1) being in class 1 (e.g., the customer 102 is satisfied with the merchant 112(1)), or class 2 (e.g., the customer 102 is unsatisfied with the merchant 112(1)), given the input data received at 704.

At 708, the rating module 134 may determine a rating 206 of the merchant 112 based at least in part on the inferred satisfaction output by the classifier 132. The rating may be on any suitable scale, such as a 5 star rating system, and may be imputed to the customer 102 and added to the merchant data 123. The process 700 may provide a seamless process for inferring merchant ratings through machine learning that involves little to no user interaction or effort on the part of the customer 102.

As an illustrative scenario of the process 700, the customer 102 may visit a restaurant of merchant 112(1). The customer 102 may wait a certain amount of time to be seated at a table, and once seated, may order Phad Thai and a drink for $10. The customer 102 may order two additional drinks, making for a total of three drinks that is two more than his/her average of one drink per meal at similar restaurants. At the end of the meal, the customer 102 may leave a gratuity that is 10% more than his usual gratuity. Much of the above can be collected as behavior data 122 such as by processing a payment at the POS system of the merchant 112(1) and transmitting the information over the network(s) 108 to the server(s) 106 of the host. Thereafter, the customer satisfaction classifier 132 applies the machine learning model 128 to the behavior data 122 to infer a customer satisfaction score, which translates into a merchant rating of 4 out of 5 starts. On a subsequent engagement, the customer 102 may visit the same merchant(s), this time with a number of friends. All of the friends may check-in on a social media application at similar times to indicate that the group of people are at the restaurant, and this data can be collected by the data collector 120. The customer satisfaction classifier 132 may determine another customer satisfaction score for the customer, re-rate the merchant 112(1), and may surface an implicit customer review indicating that the customer 102 enjoyed his/her experience at the merchant.

As another illustrative scenario of the process 700, a customer 102 may visit a restaurant of the merchant 112(1) and may check-in via a social media application on his/her client device 104, which, when obtained by the data collector 120, is a good estimation of a start time of the customer's engagement with the merchant 112(1). Additionally, or alternatively, the customer 102 may have made a reservation for a table at the restaurant through a reservation service provided by the host 110, which may also work as an estimate of the start time of the engagement. The customer 102 may spend a longer-than-usual amount of time at the restaurant, the duration being determined from an end time of the engagement deduced from signals such as a check-in at a different location subsequent to a check-in at the restaurant, or a processed transaction at the POS system 124 of the merchant 112. The machine learning model 128 may be applied to the longer-than-usual duration of the engagement to return a customer satisfaction score that indicates a level of the customer's satisfaction with the merchant 112(1). In some instances, the customer 102 may be enjoying themselves and may be ordering more drinks than usual, which may be the reason for the customer's longer-than-usual engagement. However, it may be the case that service is unusually slow. Thus, a collection of signals may be obtained and evaluated by the classifier 132 in returning the customer satisfaction score. For example, a number and/or type of items ordered may shed light on the situation, or the type of restaurant (e.g., fast food vs. leisurely sit down restaurant) may indicate whether the duration of the engagement is a positive or a negative signal.

As another illustrative scenario of the process 700, a customer 102 may visit a restaurant and may be enjoying himself/herself so much that the customer 102 is verbally expressing how much he/she is enjoying the restaurant. In this situation, the microphone of the customer's client device 104 may be accessed to obtain audio data to capture the customer's voice. When an audio signal representative of the audio data is processed (e.g., using speech recognition), emotive terms may be detected in the audio stream to determine a sentiment of the customer 102, which may be input to the classifier 132 to apply the machine learning model 128 to the sentiment data for returning a customer satisfaction score. In this scenario, the speech recognition may be configured to identify contextual cues like the business name of the merchant 112, or words related to the items sold by the merchant 112 in order to deduce whether the customer 102 is talking about the merchant and items related thereto, or something else completely off-topic (e.g., the customer's feelings about the day they just had at work).

As another illustrative scenario of the process 700, a customer 102 may visit a merchant location that is in a category of merchant locations that fosters social interaction with others (e.g., a bar or tavern). The data collector 120 may collect data relating to an amount by which the customer 102 is using his/her mobile phone 104. For example, use of the customer's device 104 may be tracked via an application on the device 104 to relay the amount of time spent using the phone, or a frequency with which the customer 102 uses the device 104 during the engagement with the merchant 112. The customer satisfaction classifier 132 may apply the machine learning model 128 to infer that the customer 102 is unsatisfied with the merchant 112 based on the amount of time the customer's device 104 is used during the engagement. The classifier 132 may deduce that the customer's use of the device 104 is consistent with past use at similar merchant locations, and may instead infer that the customer 102 is satisfied with the merchant 112.

As another illustrative scenario of the process 700, a customer 102 may visit a restaurant of the merchant 112(1), and may wait an unusually long time for service (e.g., to be seated at a table). This could be a positive or negative signal depending on the situation. For example, the customer 102 may be predisposed to liking the restaurant and is willing to wait the extra amount of time for service, or the customer 102 may not have any other choices and is more or less forced to wait the extra amount of time. In a similar scenario, the customer 102 may have visited the restaurant and decided to leave after a period of time waiting for service (e.g., the customer 102 may not have been willing to wait 15 minutes for a table, indicating that the customer 102 does not think very highly of the merchant 1129(1). The customer satisfaction classifier 132 is configured to process this data and return a customer satisfaction score.

As another illustrative scenario of the process 700, the customer 102 may visit a merchant 112(1), and may subsequently visit a merchant 112(2) in a similar category of merchants to that of the merchant 112(1), or that offers similar items to those offered by the merchant 112(1). This "subsequent behavior data" may be collected in association with the customer's engagement with the merchant 112(1) to infer the customer's satisfaction with the merchant 112(1). For example, the customer 102 may visit another Thai restaurant after a first Thai restaurant, which may imply that the customer 102 was unsatisfied with the first Thai restaurant.

Figure 8:
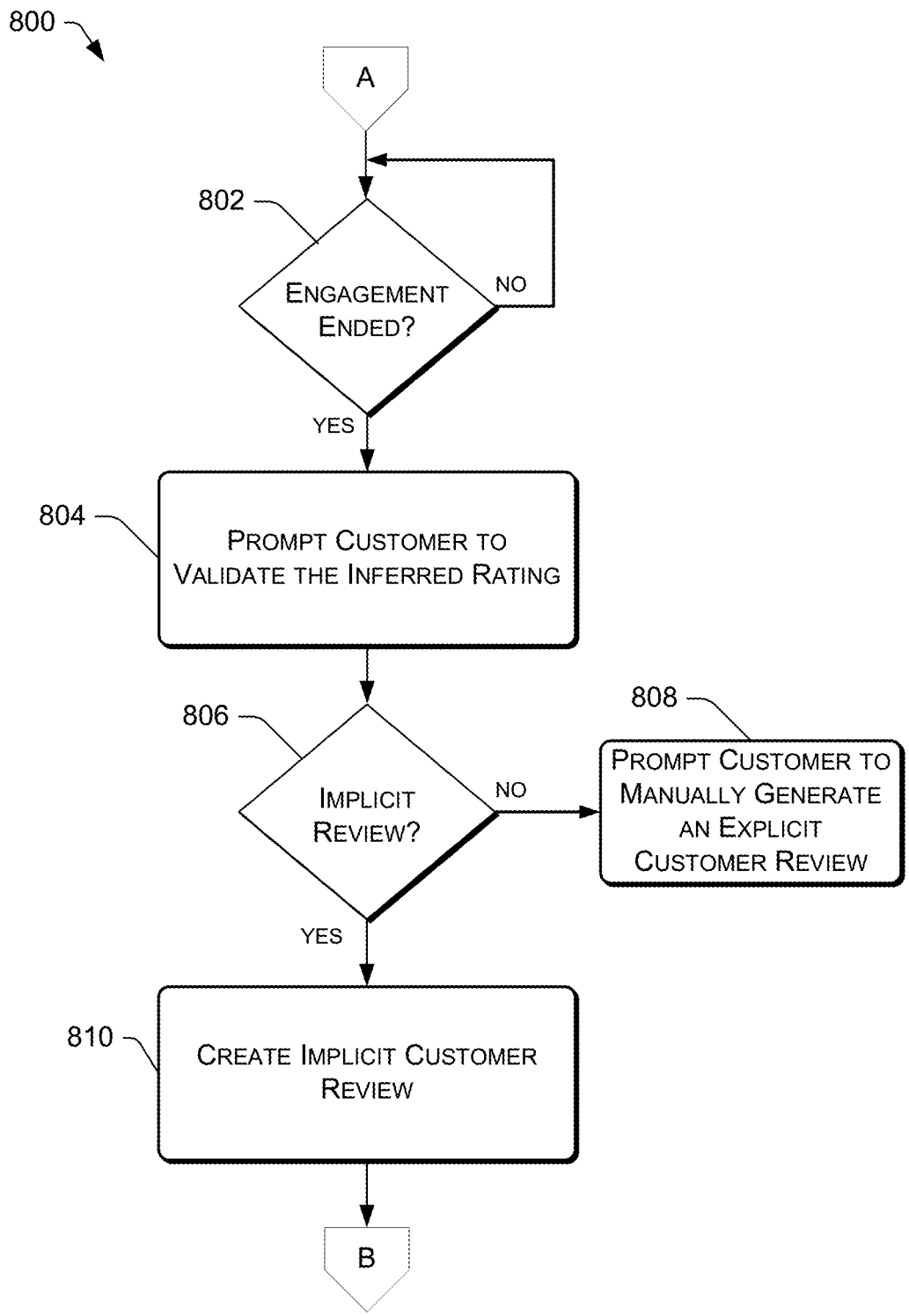
FIG. 8 is a flow diagram of an illustrative process for prompting a customer based on an inferred merchant rating.

FIG. 8 is a flow diagram of an illustrative process 800 for prompting a customer 102 based on an inferred merchant rating 206. For discussion purposes, the process 800 is described with reference to the environment 100 of FIG. 1, and specifically with reference to the rating module 134 and the user interface manager 118. The process 800 may continue from step 708 of the process 700, as indicated by the off-page reference "A" in FIGS. 7 and 8.

At 802, a determination may be made as to whether a customer engagement with a merchant 112 has ended. Any suitable data may be taken as an indicator of the end of a customer-merchant engagement. For example, data relating to processing a payment or otherwise completing a transaction for an item provided by the merchant 112 may be used as an indicator of the end of an engagement. Other indicators may be used as well, such as data regarding the customer's location (e.g., moving beyond a threshold distance from the merchant location of the merchant 112, navigating away from the merchant's website, and so on.

If it is determined at 802 that the engagement has not ended, the process 800 may loop by following the "no" route until it is determined that the engagement has ended. Once an indication of the end of the engagement has been received at 802, the process 800 may follow the "yes" route to 804 where the customer 102 may be prompted to validate the merchant rating determined at step 708 of the process 700. This may be in the form of a prompt similar to that shown in FIG. 2.

At 806, a determination may be made as to whether an implicit customer review 408 is to be generated. If not, the process 800 may follow the "no" route from 806 to step 808 where the customer 102 may be prompted to manually generate an explicit customer review 406. In this instance, the merchant rating 206 inferred from the process 700 may assist the customer 102 in writing a review themselves.

If an implicit customer review 408 is to be generated, the process 800 may follow the "yes" route from 806 to step 810 where an implicit customer review 408 is created by the review generator 138.

Figure 9:
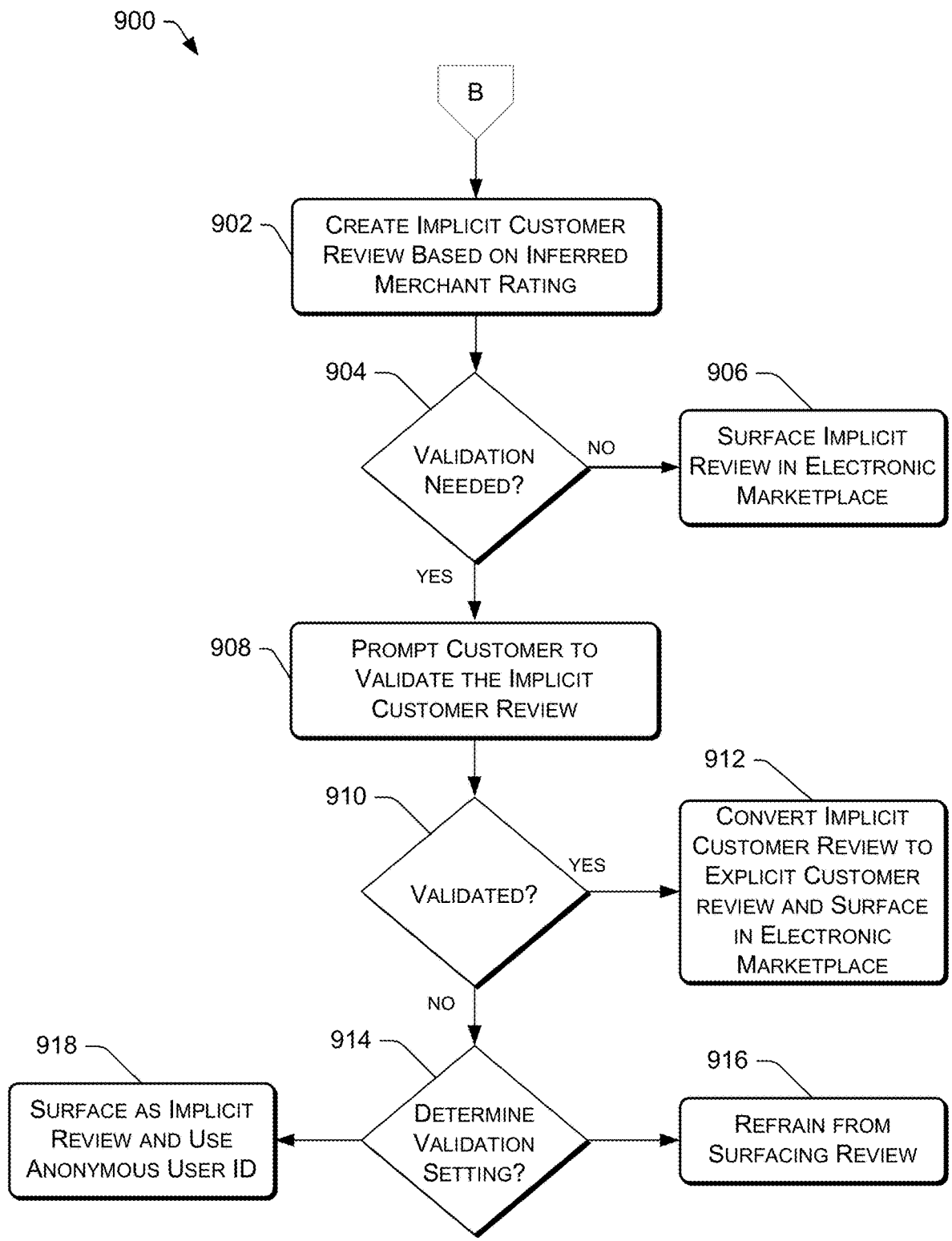
FIG. 9 is a flow diagram of an illustrative process for creating and surfacing implicit customer reviews.

FIG. 9 is a flow diagram of an illustrative process 900 for creating and surfacing implicit customer reviews, such as the implicit customer review 408 of FIG. 4. For discussion purposes, the process 900 is described with reference to the environment 100 of FIG. 1, and specifically with reference to the review generator 138 and the user interface manager 118. The process 900 may continue from step 810 of the process 800, as indicated by the off-page reference "B" in FIGS. 8 and 9.

At 902, the review generator 138 may create an implicit customer review 408 based on an inferred merchant rating, such as the merchant rating determined at 708 using machine learning techniques.

At 904, a determination is made as to whether customer validation is needed. Logic for the determination at 904 may be based on any suitable criteria, such as merchant and/or item category, tagged items and/or merchants, and/or anomalies in the data regarding the customer-merchant engagement. For example, certain categories of items and/or merchants 112 may be regarded as more private in nature in that they may reveal information about a customer 102 that is more private in nature (e.g., when the customer 102 visits a merchant 112 selling, or buys items related to tobacco products and the customer 102 does not want others to know about such a purchase or such a visit). The host 110 may, in an automated, semi-automated, or manual process select such item categories or merchant categories, or may individually tag items and merchants that require validation at 904. As another example, the data that generated the inferred merchant rating 206 and the implicit customer review 408 may relate to a much lower-than-normal gratuity provided by the customer 102, and the system may set thresholds to determine how deviation from normal behavior triggers the need for validation at 904.

If no customer validation is needed, the process 900 may proceed along the "no" route from step 904 to step 906 where the user interface manager 118 may surface (e.g., post on a site) the implicit customer review 408 in an electronic marketplace of the host 110. Surfacing the implicit customer review 408 at step 906 may be in the form of the UI 400 of FIG. 4 where the implicit customer review 408 is surfaced in a customer review forum along with other implicit and explicit customer reviews about the merchant 112 in question. In some embodiments, surfacing the implicit customer review 408 at step 906 comprises presenting an anonymous description 410 of the customer 102 in association with the implicit customer review 408. The decision to use the anonymous description 410 in the surfacing step 906 may be based on predetermined settings specified by the customer 102 (e.g., via the first settings control 504 of FIG. 5).

If it is determined at 904 that customer validation is needed, the process 900 may proceed along the "yes" route from step 904 to step 908 where the customer 102 may be prompted, via his/her client device 104, to validate the implicit customer review 408. The prompting at 908 may be implemented via any suitable channel, such as prompting via e-mail, push notifications on the client device 104, SMS text, phone call, a mobile application, a website, a social networking site, and the like.

At 910, a determination is made as to whether the customer 102 has validated the implicit customer review 408. If a customer validation is received at 910, the process 900 may follow the "yes" route from 910 to step 912 where the implicit customer review 408 is converted to an explicit customer review 406 and surfaced in the electronic marketplace of the host 110 as an explicit customer review 406. In other words, the validation from the customer 102 may be taken as an approval to impute the implicit customer review to the customer 102 and to post the review in the electronic marketplace as if the customer 102 had written the customer review himself/herself.

If it is determined at 910 that no validation is received (e.g., via timeout) from the customer 102, the process 900 may proceed along the "no" route from 910 to decision block 914 where the system determines the validation setting for a "no validation" output of decision block 910. If the validation setting is determined at 914 to be a setting that refrains from surfacing implicit customer reviews 408 unless the customer 102 validates them, the process 900 may proceed to step 916 where the system refrains from surfacing the review at all. If the validation setting is determined at 914 to be a setting that allows for surfacing implicit customer reviews 408 in an anonymous manner when no customer validation is received, the implicit customer review 408 is surfaced at 918 by the user interface manager 118 as an implicit customer review 408 with an anonymous description 410 of the customer 102. In some embodiments, the determination at 910 that the customer 102 has not validated the implicit customer review 408 may involve receiving an explicit disapproval of the implicit customer review 408. In this scenario, the user interface manager 118 may cause presentation of a prompt to the customer 102 to edit the implicit customer review 408 to his/her liking, or to write a new review from scratch.

In some embodiments, the surfaced customer reviews resulting from the process 900 may be tagged with identifiers that allow for filtering customer reviews in a review forum according to whether the reviews are implicit or explicit customer reviews. As such, a consumer community may choose which type of customer review they want to view in the electronic marketplace.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   memory;
   one or more processors; and
   computer-executable instructions stored in the memory and executable by the one or more processors to perform operations comprising:
   collecting first data associated with a customer, the first data being based at least in part on engagements between the customer and a plurality of merchants that each provide items for purchase;
   using the first data to associate class labels with individual ones of the plurality of merchants, the class labels corresponding to a satisfaction of the customer with the individual ones of the plurality of merchants;
   training a logistic regression-based classification model using the first data and the class labels;
   receiving an indication of an engagement of the customer with a particular merchant;
   receiving second data associated with the engagement, wherein a type of the second data comprises data relating to one or more gratuities provided by the customer at the particular merchant;
   classifying the particular merchant with a class label of the class labels by applying the logistic regression-based classification model to the second data, wherein the logistic regression-based classification model, when applied to the second data, models the posterior probabilities of K classes with linear functions of inputs, where K is a finite number of classes;
   determining a rating of the particular merchant based at least in part on the class label for the particular merchant;
   selecting, based at least in part on the type of the second data, a template with language pertaining to gratuities, the template selected from multiple templates that are associated with the rating;
   using the template to create an implicit customer review of the particular merchant based at least in part on the rating;
   prompting the customer, via a client computing device of the customer, to validate the implicit customer review;
   determining that a validation of the implicit customer review is not received prior to a timeout; and
   based at least in part on determining that the validation of the implicit customer review is not received prior to the timeout, surfacing the implicit customer review with an anonymous description of the customer within an electronic marketplace.

2. The system of claim 1, the operations further comprising:
   determining that the engagement has ended,
   wherein prompting the customer to validate the implicit customer review occurs in response to determining that the engagement has ended.

3. The system of claim 1, the operations further comprising, prior to receiving the indication of the engagement:
   calculating metrics for the customer based at least in part on the first data,
   wherein training the logistic regression-based classification model is further based at least in part on the metrics.

4. The system of claim 1, wherein the first data includes data relating to additional gratuities provided by the customer at the plurality of merchants.

5. The system of claim 1, the operations further comprising, prior to surfacing the implicit customer review, generating the anonymous description of the customer based at least in part on at least one of demographic information in a user profile of the customer or location information associated with the customer.

6. The system of claim 1, wherein surfacing the implicit customer review comprises surfacing the implicit customer review within a list of customer reviews of the particular merchant from additional customers, the list of customer reviews including implicit customer reviews and explicit customer reviews, the operations further comprising:
   tagging the customer reviews of the particular merchant to distinguish the implicit customer reviews from the explicit customer reviews; and
   providing a filtering mechanism for a user to filter the customer reviews by the implicit customer reviews or the explicit customer reviews.

7. The system of claim 6, the operations further comprising causing presentation of respective visual indicators in association with the customer reviews to visually distinguish the implicit customer reviews from the explicit customer reviews.

8. A method comprising:
   collecting, by one or more computing devices, first data associated with a customer, the first data being based at least in part on engagements between the customer and a plurality of merchants that each provide items for purchase;
   using, by the one or more computing devices, the first data to associate class labels with individual ones of the plurality of merchants, the class labels corresponding to a satisfaction of the customer with the individual ones of the plurality of merchants;
   training, by the one or more computing devices, a logistic regression-based classification model using the first data and the class labels;
   receiving, by the one or more computing devices, an indication of an engagement of a customer with a merchant;
   receiving, by the one or more computing devices, second data associated with the engagement, wherein a type of the second data comprises data relating to one or more gratuities provided by the customer at the merchant;
   applying, by the one or more computing devices, the logistic regression-based classification model to the second data to classify the merchant with a class label of the class labels, wherein the logistic regression-based classification model, when applied to the second data, models the posterior probabilities of K classes with linear functions of inputs, where K is a finite number of classes;

determining, by the one or more computing devices, a rating of the merchant based at least in part on the class label;

selecting, by the one or more computing devices, and based at least in part on the type of the second data, a template with language pertaining to gratuities, the template selected from multiple templates that are associated with the rating;

using, by the one or more computing devices, the template to create an implicit customer review of the merchant based at least in part on the rating;

prompting, by the one or more computing devices, the customer, via a client computing device of the customer, to validate the implicit customer review;

determining, by the one or more computing devices, that a validation of the implicit customer review is not received prior to a timeout; and based at least in part on determining that the validation of the implicit customer review is not received prior to the timeout, surfacing, by the one or more computing devices, the implicit customer review with an anonymous description of the customer within an electronic marketplace.

9. The method of claim 8, further comprising:
determining that the engagement has ended,
wherein the prompting the customer to validate the implicit customer review occurs in response to determining that the engagement has ended.

10. The method of claim 8, wherein surfacing the implicit customer review comprises surfacing the implicit customer review within a list of customer reviews of the merchant from additional customers, the list of customer reviews including implicit customer reviews and explicit customer reviews, the method further comprising:

tagging the customer reviews of the merchant to distinguish the implicit customer reviews from the explicit customer reviews; and providing a filtering mechanism for a user to filter the customer reviews by the implicit customer reviews or the explicit customer reviews.

11. The method of claim 10, further comprising causing presentation of respective visual indicators in association with the customer reviews to visually distinguish the implicit customer reviews from the explicit customer reviews.

12. The method of claim 8, further comprising, prior to receiving the indication of the engagement:
obtaining merchant data associated with the plurality of merchants; and
wherein training the logistic regression-based classification model is further based at least in part on the merchant data.

13. The method of claim 8, wherein the first data includes data relating to at least one of:
additional gratuities provided by the customer at the plurality of merchants;
durations of time that the customer was engaged with the plurality of merchants;
numbers of items purchased from the plurality of merchants;
numbers of friends invited to the engagements;
frequencies at which the customer engaged the plurality of merchants;

transaction amounts for items purchased by the customer from the plurality of merchants; or
social data pertaining to the plurality of merchants.

14. The method of claim 8, further comprising, prior to training the logistic regression-based classification model, calculating metrics for the customer based at least in part on the first data, wherein applying the logistic regression-based classification model to the second data comprises applying the logistic regression-based classification model to the metrics.

15. One or more non-transitory computer-readable media storing computer-executable instructions that, when executed by one or more processors, cause performance of operations comprising:

collecting first data associated with a customer, the first data being based at least in part on engagements between the customer and a plurality of merchants that each provide items for purchase;

using the first data to associate class labels with individual ones of the plurality of merchants, the class labels corresponding to a satisfaction of the customer with the individual ones of the plurality of merchants;

training a logistic regression-based classification model using the first data and the class labels;

receiving an indication of an engagement of the customer with a merchant;

receiving second data associated with the engagement, wherein a type of the second data comprises data relating to one or more gratuities provided by the customer at the merchant;

classifying the merchant with a class label of the class labels by applying the logistic regression-based classification model to the second data, wherein the logistic regression-based classification model, when applied to the second data, models the posterior probabilities of K classes with linear functions of inputs, where K is a finite number of classes;

determining a rating of the merchant based at least in part on the class label;

selecting, based at least in part on the type of the second data, a template with language pertaining to gratuities, the template selected from multiple templates that are associated with the rating;

using the template to create an implicit customer review of the merchant based at least in part on the rating;

prompting the customer, via a client computing device of the customer, to validate the implicit customer review;

determining that a validation of the implicit customer review is not received prior to a timeout; and based at least in part on determining that the validation of the implicit customer review is not received prior to the timeout, surfacing the implicit customer review with an anonymous description of the customer within an electronic marketplace.

16. The one or more non-transitory computer-readable media of claim 15, the operations further comprising:
determining that the engagement has ended,
wherein prompting the customer to validate the implicit customer review occurs in response to determining that the engagement has ended.

17. The one or more non-transitory computer-readable media of claim 15, wherein the first data includes data relating to additional gratuities provided by the customer at the plurality of merchants.

18. The one or more non-transitory computer-readable media of claim 15, the operations further comprising, prior to surfacing the implicit customer review, generating the anonymous description of the customer based at least in part on at least one of demographic information in a user profile of the customer or location information associated with the customer.

19. The one or more non-transitory computer-readable media of claim 15, wherein surfacing the implicit customer review comprises surfacing the implicit customer review within a list of customer reviews of the merchant from additional customers, the list of customer reviews including implicit customer reviews and explicit customer reviews, the operations further comprising:
   tagging the customer reviews of the merchant to distinguish the implicit customer reviews from the explicit customer reviews; and
   providing a filtering mechanism for a user to filter the customer reviews by the implicit customer reviews or the explicit customer reviews.

20. The one or more non-transitory computer-readable media of claim 19, the operations further comprising causing presentation of respective visual indicators in association with the customer reviews to visually distinguish the implicit customer reviews from the explicit customer reviews.

\* \* \* \* \*